(12) United States Patent
Brahmadesam et al.

(10) Patent No.: US 12,130,798 B1
(45) Date of Patent: Oct. 29, 2024

(54) VARIABLE RECLAMATION OF DATA COPIES

(71) Applicant: Amazon Technologies, Inc., Seattle, WA (US)

(72) Inventors: Murali Brahmadesam, Woodinville, WA (US); Changan Han, Bellevue, WA (US); Raman Mittal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 15/625,933

(22) Filed: Jun. 16, 2017

(51) Int. Cl.
*G06F 16/23* (2019.01)
*G06F 3/06* (2006.01)
*G06F 16/22* (2019.01)

(52) U.S. Cl.
CPC ........ *G06F 16/2365* (2019.01); *G06F 3/0619* (2013.01); *G06F 3/065* (2013.01); *G06F 3/067* (2013.01); *G06F 16/22* (2019.01)

(58) Field of Classification Search
None
See application file for complete search history.

(56) References Cited

U.S. PATENT DOCUMENTS

| | | | |
|---|---|---|---|
| 6,513,101 B1* | 1/2003 | Fisher | G06F 3/0601 |
| | | | 707/999.005 |
| 7,376,674 B2 | 5/2008 | Lastovica, Jr. | |
| 8,352,431 B1 | 1/2013 | Protopopov et al. | |
| 8,533,158 B1* | 9/2013 | Rao | G06F 3/0608 |
| | | | 707/646 |
| 8,775,751 B1* | 7/2014 | Pendharkar | G06F 3/0608 |
| | | | 707/649 |
| 10,180,951 B2 | 1/2019 | Gupta et al. | |
| 10,216,757 B1* | 2/2019 | Armangau | G06F 16/125 |
| 10,466,924 B1* | 11/2019 | Newstadt | G06F 21/79 |
| 2012/0084524 A1* | 4/2012 | Gokhale | G06F 11/1415 |
| | | | 711/162 |
| 2014/0089264 A1* | 3/2014 | Talagala | G06F 3/065 |
| | | | 707/649 |
| 2017/0032012 A1* | 2/2017 | Zhang | G06F 16/1748 |
| 2020/0050541 A1* | 2/2020 | Johannes de Jong | |
| | | | G06F 12/0246 |

* cited by examiner

*Primary Examiner* — Kris E Mackes
*Assistant Examiner* — Soheila (Gina) Davanlou
(74) *Attorney, Agent, or Firm* — S. Scott Foster; Kowert, Hood, Munyon, Rankin & Goetzel, P.C.

(57) ABSTRACT

Variable reclamation of data copies can be performed. Copies of data may be stored in a data store. The copies of the data may be available to restore or return the data to a state described in or based on one of the copies. One or more copies, or portions of a copy, may be selected for invalidation according to a variable rate. The variable rate may be determined based on accesses to the data. Selected copies, or portions of a copy, may then be invalidated.

20 Claims, 13 Drawing Sheets

VARIABLE RECLAMATION OF DATA COPIES

BACKGROUND

Storage systems capture snapshots or other backup copies of data to provide restoration capabilities and other capabilities to access older versions of data stored in the storage system. For example, a restore operation may be performed to make a backup of data available for a user to access in order to allow the user to undo or revert to a prior state of the data. Restoring a database to a prior state may be useful in many different scenarios. In another example, developers can use older versions of data may be useful as part of testing modifications to systems or services that access the data to ensure that the developing systems, services, or tools are backward compatible with the older versions of the data when, for instance, the older versions of the data are stored according to a different format or schema. While maintaining many backup copies of data may improve the granularity or speed in which restore operations or other operations that provide access to older versions of the data are performed, the cost of maintaining backup copies can become cumbersome. Techniques that identify the optimal backup copies to maintain may still provide desirable restore capability with lower storage costs.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 1:
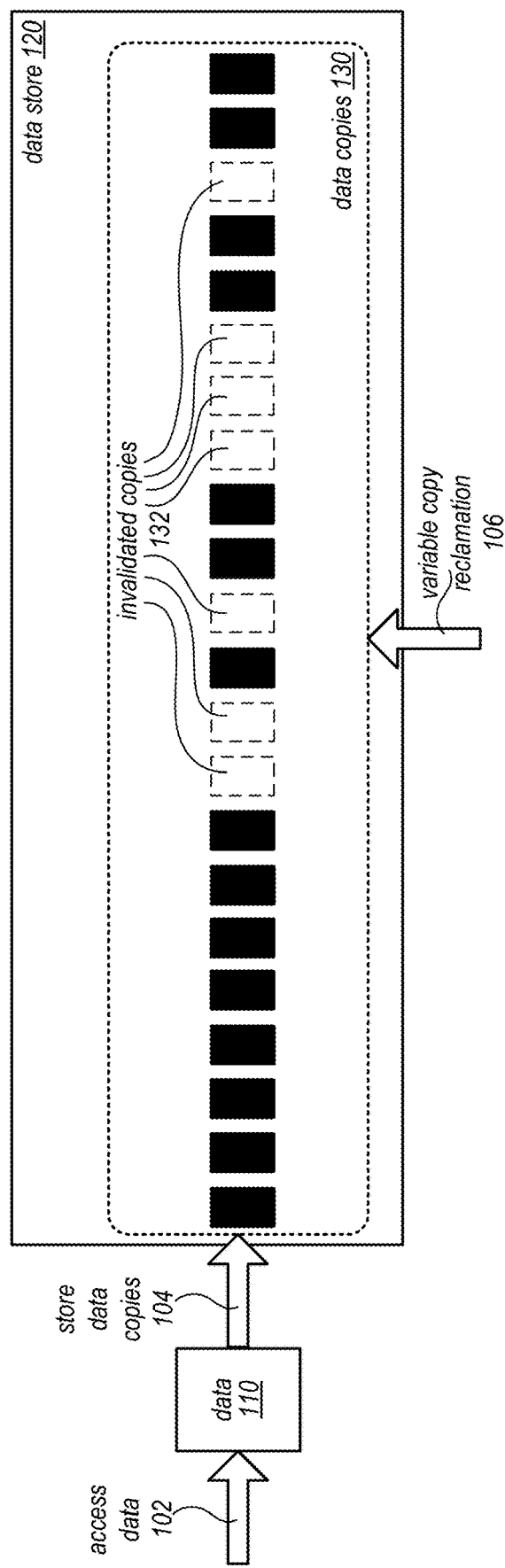
FIG. 1 is a logical block diagram illustrating variable reclamation of data copies, according to some embodiments.

Various embodiments of variable reclamation of data copies are described herein. In various embodiments, copies of different versions of data, such as database, file system, or other data set snapshots, may be stored. These copies may be stored according to an initial rate or frequency so that restore operations or other operations that provide access to or return to version of data stored in a copy may have several versions of the data to select from, in various embodiments. In this way, the version of the data selected may be closest to a desired state (e.g., just prior to an unwanted change to the data), in some embodiments, or as discussed below may provide a faster generation of the desired version if changes from a change log are applied to achieve the desired state. While the initial rate of storing copies of data may provide for optimal performance when providing access to or returning to a different state of data, the growing storage costs or burdens of maintaining the copies of the data may become unacceptable or suboptimal, in some scenarios. Variable reclamation of data copies may reclaim or otherwise invalidate stored copies according to a variable rate so that those copies of the data retained still provide optimal versions of the data for restore or other operations that access the different versions of the data maintained by the copies without incurring the higher costs or burdens of retaining every stored copy. FIG. 1 is a logical block diagram illustrating variable reclamation of data copies, according to some embodiments.

Data 110 may be a set of data, collection of records, or other grouping of data objects, (e.g., one or more files, a file system, database volumes, data pages, data blocks, or other structures) in one embodiment, which may be accessed 102, in some embodiments. For example, if data 110 is a database volume, then access 102 to data 110 may be performed in order to perform queries to read data from a database table stored as part of data 110 or add or remove data from a database table stored as part of data 110. In another example embodiment, data 110 may be one or more file (or an entire file system) that is accessed (in order to read from or write to files in the file system stored as part of data 110.

Data 110 which may be separate from or the same as data store 120 that stores copies 130 of data 110, in various embodiments. A data store may be one or more directly or network attached storage devices, accessible to a storage system (e.g., for a database or file system), such as block-based storage devices like hard disk drives or solid state drives, or may be a separate storage system, such as the storage service discussed below with regard to FIGS. 2-9, which may distribute the data amongst multiple different storage nodes in order to provide redundancy and availability for the data, in some embodiments. In at least some embodiments, data 110 may be stored in one or more portions of data store, such as data pages, data blocks, segments, partitions, such as the volume format discussed below with regard to FIG. 6. As illustrated in FIG. 1, copies of data 110 may be stored 104 in data store 120. These stored data copies 130 may describe different versions of data 110. In at least some embodiments, copy on write or other techniques may be implemented to reduce the size of each copy so that a copy may not be an exact copy of data 110 as discussed below with regard to FIGS. 7 and 8, in some embodiments, but may be a description of or representation to generate a complete copy of the data 110 as of the version or state of data 110 to which the copy corresponds (e.g., as of a prior point in time). Copies 130 of data may be stored 104 according to an initial or fixed rate, in some embodiments, such as at fixed time intervals or fixed change intervals (e.g., in terms of number or amount of data describing the changes, such as 10 MB of log records).

Variable reclamation of copies 106 may be performed, in various embodiments. Copies 130 may be reclaimed or otherwise invalidated for restoration or other access according to a variable rate, in some embodiments. The variable rate may be for performing invalidation and may be determined from selection of copies according to accesses 102 to data 110. For example, the selection criteria for invalidation may be determined from or evaluated by the accesses 102 made to data 110 (e.g., requests to add, remove, delete, update, or otherwise modify the data), in some embodiments. Selection criteria may be determined from accesses to the data in some embodiments. For example, a time series analysis of updates or other changes to the data (e.g., of log records in a change log) may be performed to identify points, periods, or ranges in time for which few updates are performed, which may indicate selection criteria when considering copies for invalidation. In some embodiments, heuristics specific to a user (or users) of data 110 may be determined and used to identify selection criteria. For example, prior operations or other requests for copies of the data (e.g., database snapshots to perform restore operations) made by a user with respect to data 110 may be tracked to determine patterns or other indications of copies 130 that are likely to be restored or otherwise provided access to. Invalidation of a copy 130 may be performed in various ways, such as deletion, marking, modification, or other identification that makes the copy unavailable for access. The storage space in data store 120 may be made available for storing other data, in some embodiments, such as newly stored copies 104.

Please note, FIG. 1 is provided as a logical illustration of variable reclamation of data copies and is not intended to be limiting as to the physical arrangement, size, or number of components, modules, or devices implementing data, data copies or a data store. In some embodiments, a log of changes may be maintained so that between each copy 130 the changes that lead from one copy to another are recorded or otherwise maintained (e.g., in data store 120). In this way, a restore operation may identify a copy 130 and then replay or apply changes from the log to provide access to a state of data 110 that is between stored copies, in some embodiments. In some embodiments, invalidated copies 132 may be invalidated portions of copies (e.g., individual data pages, blocks, objects, files, etc.) within a copy that are invalid for subsequent access.

The specification first describes an example of a database system as a network-based database service that stores data for a database managed by the database service in a separate data storage service, according to various embodiments. Included in the description of the example network-based database service are various aspects of the example network-based database service along with the various interactions between the database service, the storage service including the performance of variable reclamation of snapshots generated for a database (e.g., as part of backup and other restore techniques for the database). The specification then describes flowcharts of various embodiments of methods for variable reclamation of data copies. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), a separate, distributed storage system (which may include multiple storage nodes that collectively perform some of the operations traditionally performed in the database tier of existing systems), and a backup storage tier.

As described in more detail herein, in some embodiments, some of the lowest level operations of a database, (e.g., backup, restore, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process. In some embodiments, the storage layer may maintain backup versions of data volumes in a separate storage system (e.g., another storage service implemented as part of network-based services platform 200) by leveraging peer-to-peer replication among storage nodes to identify and obtain new updates to data volumes for inclusion in backup versions.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. Rather than duplicating an entire database instance one or more times and adding glue logic to stitch them together to scale a database, the systems described herein may instead offload the functionality of durability and space management layer from the database tier to a separate storage layer, and may distribute that functionality across multiple storage nodes in the storage layer, in some embodiments.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database, in some embodiments. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow copy creation, backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions, in one embodiment.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. A data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume, in some embodiments. For example, in some embodiments, in response to a request to make a change to a database, the client-side driver may determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future, in some embodiments. As writes are acknowledged back to the client-side driver, the client-side driver may advance the point at which the volume is durable and may acknowledge commits back to the database tier, in some embodiments. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, copies or snapshots of databases may be created in the storage tier that share data pages with the source of the copy. For example, a copy of a portion of a database (e.g., an extent of a database volume), may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. In some embodiments, a backup system may store snapshots of the database in a separate backup storage system, which may include copies stored according to the same copy-on-write technique.

Figure 2:
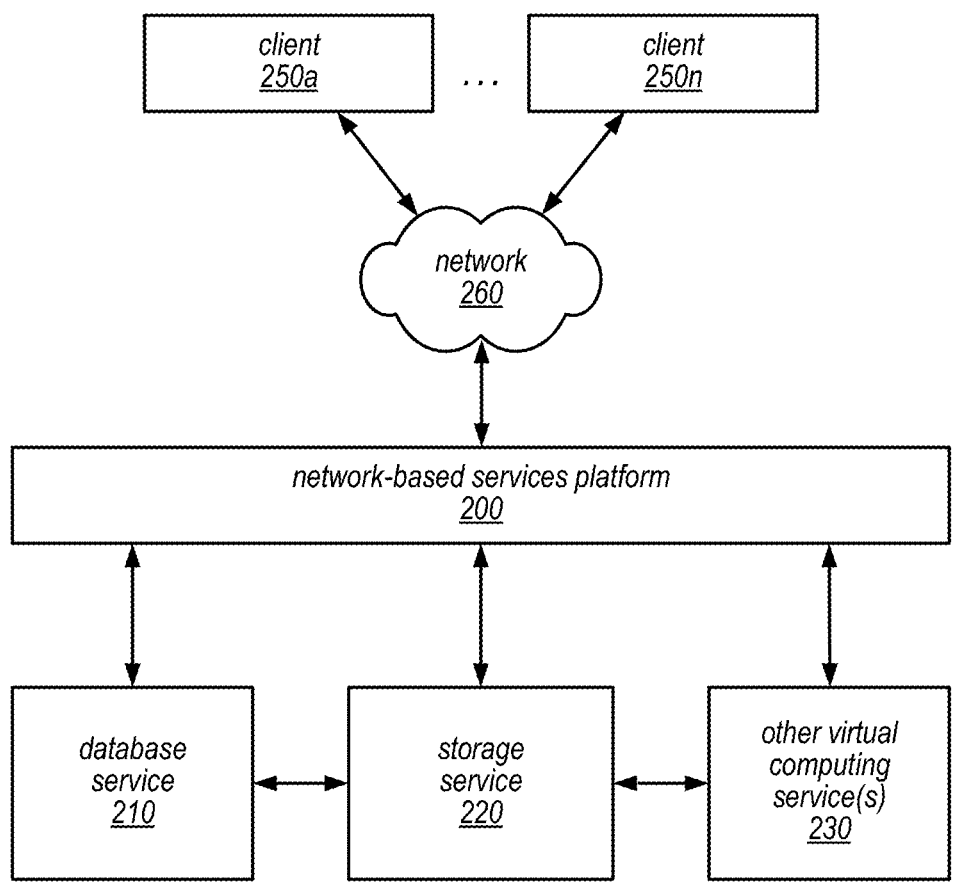
FIG. 2 is a logical block diagram illustrating a service system architecture for a network-based database service and a network-based storage service that implement variable reclamation for database snapshots, according to some embodiments.

FIG. 2 is a logical block diagram illustrating a service system architecture for a network-based database service and a network-based storage service that implement variable reclamation for database snapshots, according to some embodiments. In the illustrated embodiment, a number of clients (shown as clients 250a-250n) may interact with a network-based services platform 200 via a network 260. Network-based services platform 200 may interface with one or more instances of a database service 210, a distributed storage service 220 and/or one or more other virtual computing services 230. Storage service 220 may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Clients 250 may encompass any type of client configurable to submit network-based services requests to network-based services platform 200 via network 260, including requests for database services (e.g., a request to create a copy of a database, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., request to restore a database to prior point in time based on a stored snapshot, queries to a database, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints that receive and process network-based services requests, such as requests to access data pages (or records thereof). For example, network-based services platform 200 may include hardware and/or software may implement a particular endpoint, such that an HTTP-based network-based services request directed to that endpoint is properly received and processed. In one embodiment, network-based services platform 200 may be implemented as a server system may receive network-based services requests from clients 250 and to forward them to components of a system that implements database service 210, storage service 220 and/or another virtual computing service 230 for processing (e.g. another data storage service, such as an object data store which May store data objects that make up a backup version data volumes stored in the storage service 220. In other embodiments, network-based services platform 200 may be implemented as a number of distinct systems (e.g., in a cluster topology) implementing load balancing and other request management features to dynamically manage large-scale network-based services request processing loads. In various embodiments, network-based services platform 200 may support REST-style or document-based (e.g., SOAP-based) types of network-based services requests.

In addition to functioning as an addressable endpoint for clients' network-based services requests, in some embodiments, network-based services platform 200 may implement various client management features, in some embodiments. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter, in some embodiments. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics, in some embodiments. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database, in some embodiments. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230, in some embodiments.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. In such embodiments, clients of the distributed storage service 220 may access storage service 220 via network 260 (e.g., over the Internet). In some embodiments, a virtual computing service 230 receive storage services from storage service 220 (e.g., through an API directly between the virtual computing service 230 and storage service 220) to store objects used in performing computing services 230 on behalf of a client 250. In some cases, the accounting and/or credentialing services of platform 200 may be unnecessary for internal clients such as administrative clients or between service components within the same enterprise.

Although not illustrated, in various embodiments, storage service 220 may interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
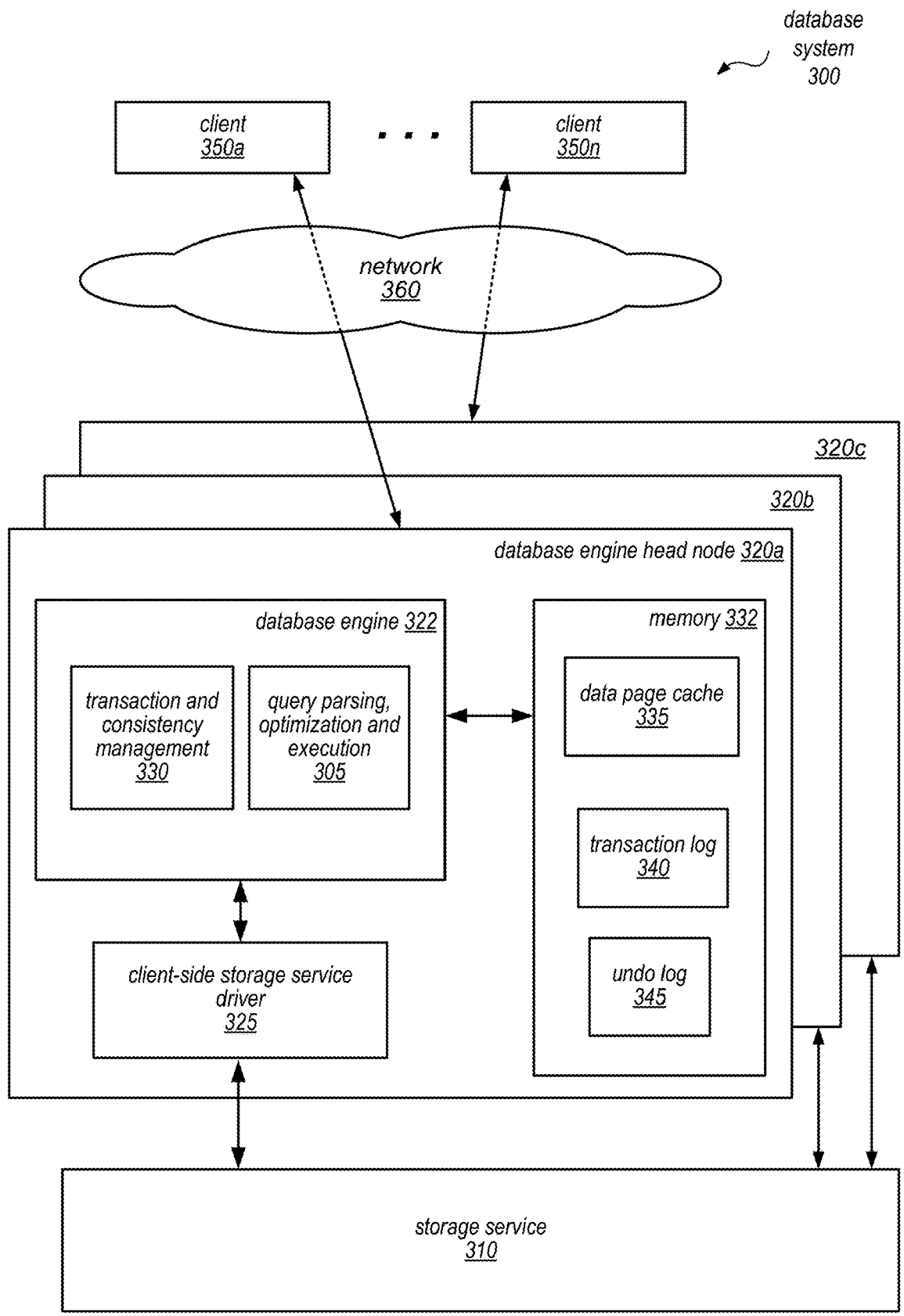
FIG. 3 is a block diagram illustrating various components of a database system that includes a database engine and a separate distributed storage service, according to some embodiments.

FIG. 3 is a block diagram illustrating various components of a database system that includes a database engine and a separate storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) and/or copies of a database volume on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., queries to read or write data, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a). Client-side storage device may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the storage systems described herein may organize data in various logical data volumes, extents (which may include partitions of the database (e.g., user data space) in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the storage service that together make an extent durable. Multiple segments, each of which lives on a particular one of the storage nodes in a protection group, are used to make the extent durable.

In some embodiments, each data page may be stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may receive redo log records (which may also be referred to herein as ULRs) and to coalesce them to create new versions of the corresponding data pages (e.g., if a data page of a copy of a database is shared with the database and the new version is created to create a different version included in the copy and not visible to the database) and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default 20) configuration, an application-specific durability preference, or a client-specified durability preference.

Figure 4:
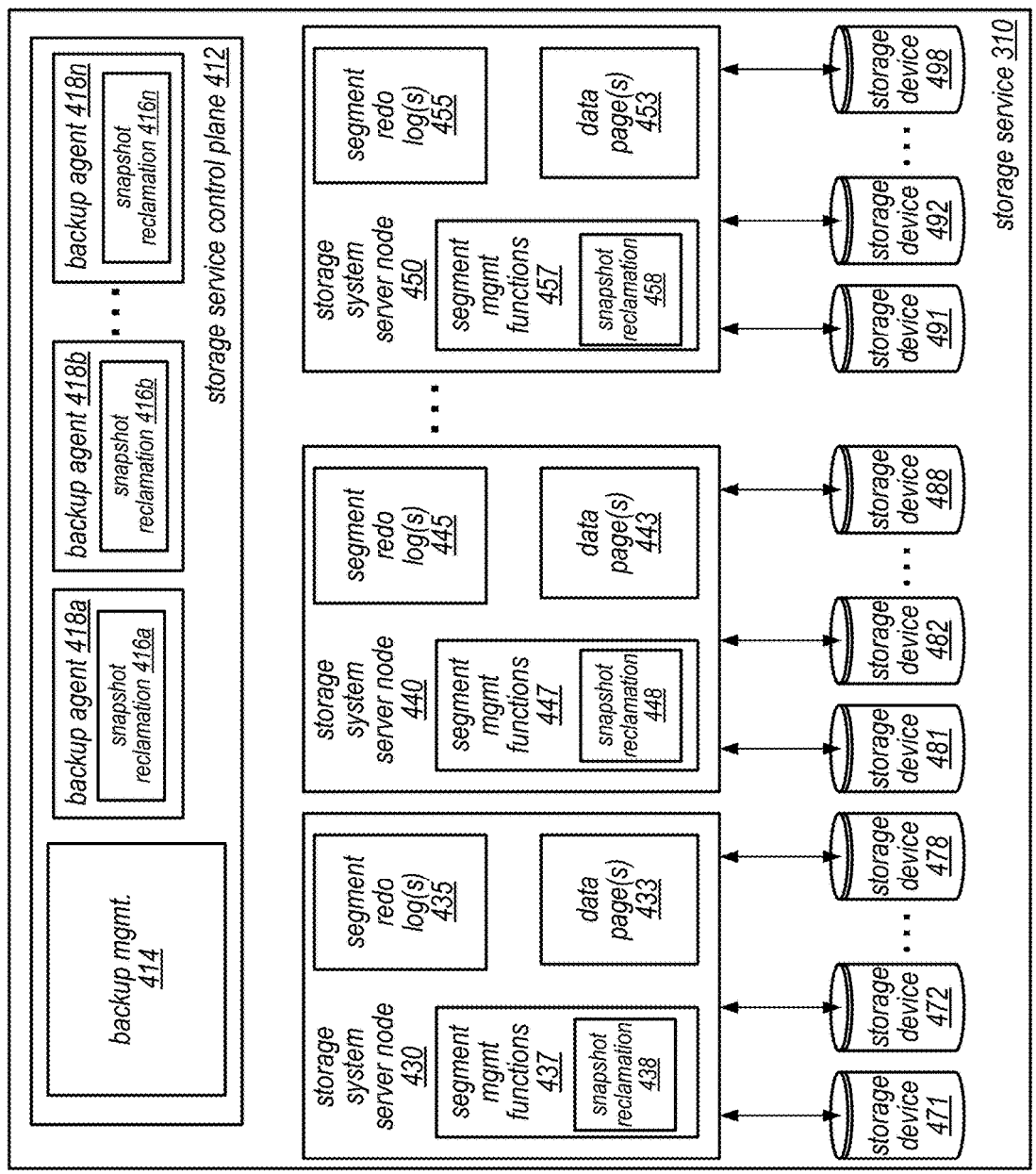
FIG. 4 is a logical block diagram illustrating a distributed storage system and backup service for the distributed storage system, according to some embodiments.

One embodiment of a storage service is illustrated by the block diagram in FIG. 4. In at least some embodiments, storage nodes 430-450 may store data for different clients as part of a multi-tenant storage service. For example, the various segments discussed above and below with regard to FIG. 6, may correspond to different protection groups and volumes for different clients.

In some embodiments, a client, such as a database engine head node, may communicate with storage system server nodes that store data as part of a database managed by a client-side storage service driver at the client. In this example, storage service includes multiple storage system server nodes (including those shown as 430, 440, and 450), each of which includes storage for data pages and redo logs for the segment(s) it stores, and hardware and/or software may perform various segment management functions 437. For example, each storage system server node may include hardware and/or software may perform at least a portion of any or all of the following operations: replication (locally, e.g., within the storage node), coalescing of redo logs to generate data pages, log management (e.g., manipulating log records), crash recovery (e.g., determining candidate log records for volume recovery), creating or reclaiming snapshots of segments stored at the storage node (e.g., as discussed below with regard to FIGS. 7, 8 and 9), and/or space management (e.g., for a segment or state storage). Each storage system server node may also have multiple attached storage devices (e.g., SSDs, HDDs, or other persistent storage devices) on which data blocks may be stored on behalf of clients (e.g., users, client applications, and/or database service subscribers).

Figure 9:
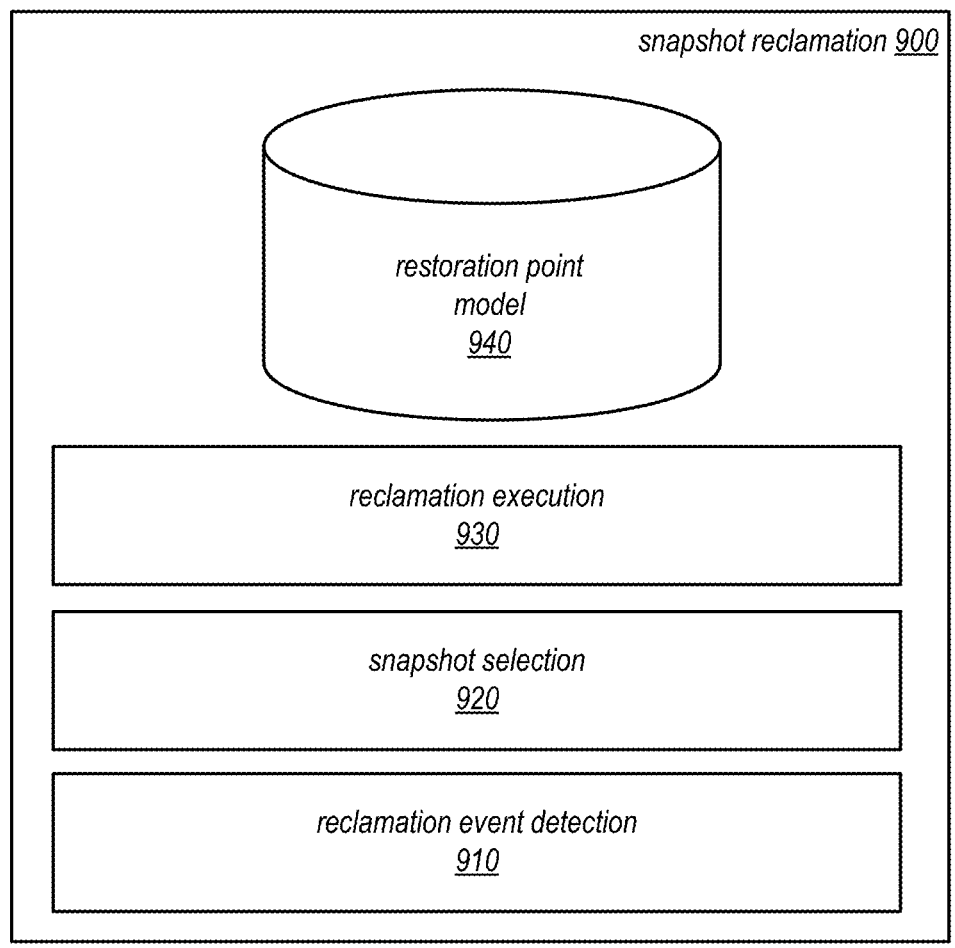
FIG. 9 is a logical block diagram illustrating snapshot reclamation, according to some embodiments.

In the example illustrated in FIG. 4, storage system server node 430 includes data page(s) 433, segment redo log(s) 435 (as discussed in more detail below with regard to FIG. 7) segment management functions 437, which may include snapshot reclamation 438 discussed below with regard to FIG. 9, and attached storage devices 471-478. Similarly, storage system server node 440 includes data page(s) 443, segment redo log(s) 445, segment management functions 447, which may include snapshot reclamation 448 discussed below with regard to FIG. 9, and attached storage devices 481-488; and storage system server node 450 includes data page(s) 453, segment redo log(s) 455, segment management functions 457 which may include snapshot reclamation 458 discussed below with regard to FIG. 9, and attached storage devices 491-498.

In some embodiments, each of the storage system server nodes in the storage system may implement a set of processes running on the node server's operating system that manage communication with the database engine head node, e.g., to receive redo logs, send back data pages, etc. In some embodiments, all data blocks written to the storage system may be backed up to long-term and/or archival storage (e.g., in a remote key-value durable backup storage system).

In some embodiments, storage service 310 may also implement a storage service control plane 412. Storage service control plane 412 may be one or more compute nodes that may perform a variety of different storage system management functions. For example, storage control plane may implement a volume manager (not illustrated), which may maintain mapping information or other metadata for a volume, such as current volume state, current writer, truncation tables or other truncation information, or any other information for a volume as it is persisted in varying different, extents, segments, and protection groups. The volume manager may communicate with a client of storage system 410, such as client-side driver in order to "mount" or "open" the volume for the client, providing the client-side driver with mapping information, protection group policies, and various other information necessary to send write and read requests to storage nodes 430-450. The volume manager may provide the maintained information to storage clients, such as a database engine head node or client-side driver or to other system components such as backup agents 418. For example, the volume manager may provide a current volume state (e.g., clean, dirty or recovery), current epoch or other version indicator for the volume and/or any other information about the data volume.

In at least some embodiments, storage service control plane 412 may implement backup management 414. Backup management 414 may implement or direct multiple backup agents 418 which may backup data volumes stored at storage nodes. For example, in some embodiments task queue(s) may be implemented that identify backup operations to be performed with respect to data volumes (e.g., describing the range of LSNs of redo log records being included in a chunk or portion of data that is to be uploaded to the backup data store). Volume backup metadata may be included as part of the backup performed by backup agent(s) 418, including the volume geometry or configuration. As discussed above with regard to FIG. 1, changes made to a database after a restore operation may be included in a log. Backup agents 418 may include respective snapshot reclamation 416 as discussed below with regard to FIG. 9, which may perform variable reclamation of snapshots for database volumes, in some embodiments.

Figure 5:
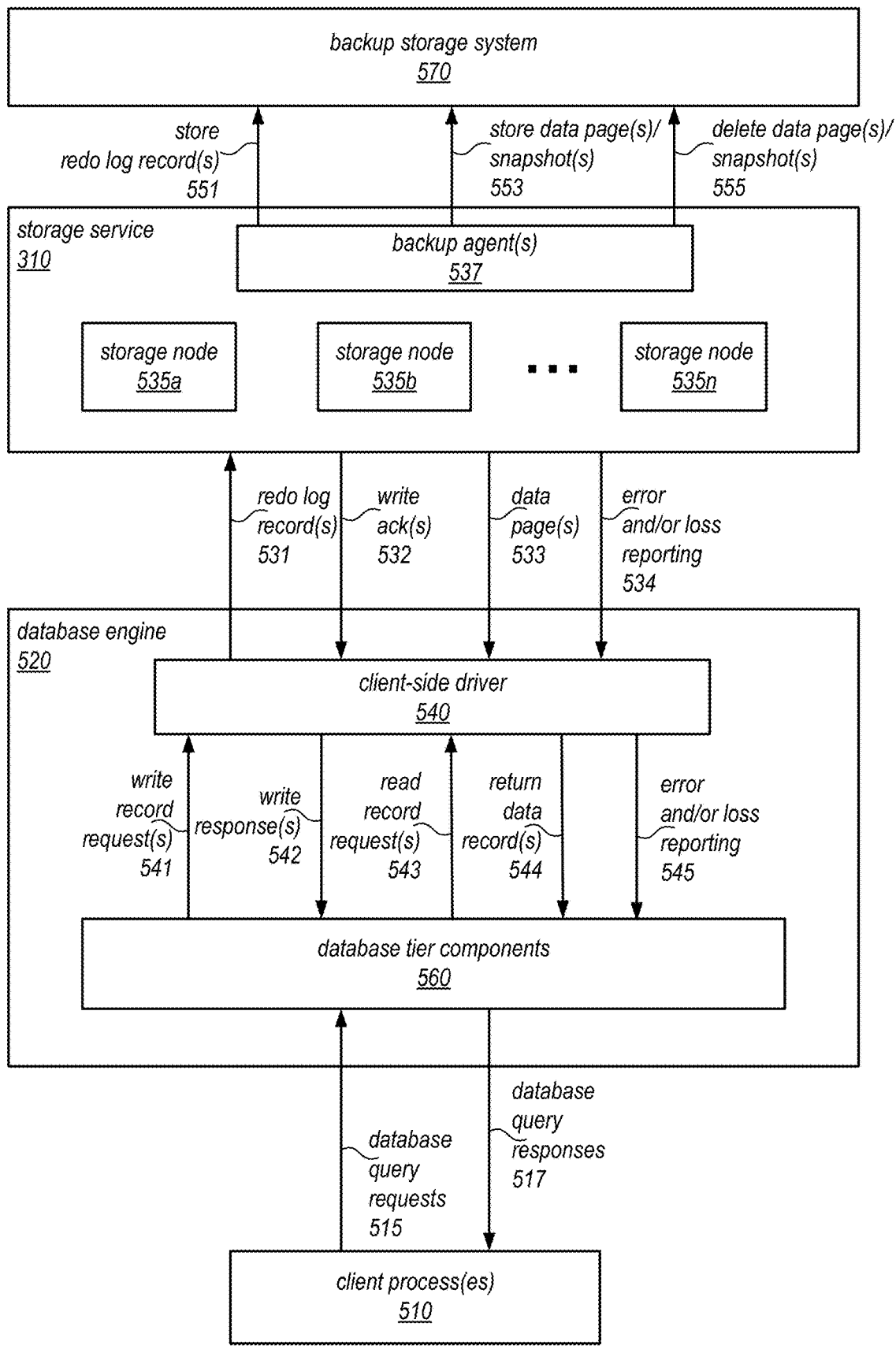
FIG. 5 is a logical block diagram illustrating the use of a separate distributed storage system in a database system, according to some embodiments.

FIG. 5 is a block diagram illustrating the use of a separate storage system in a database system, according to one embodiment. In this example, one or more client processes 510 may store data to one or more databases maintained by a database system that includes a database engine 520 and a storage system 530. In the example illustrated in FIG. 5, database engine 520 includes database tier components 560 and client-side driver 540 (which serves as the interface between storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from storage system 530 granting access writes to a particular data volume, such as by sending a request to open the data volume to storage system 530.

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in storage system 530. Storage nodes 535 may perform various peer-to-peer communications to replicate redo log records 531 received at a storage node to other storage nodes that may have not received the redo log records 431. For instance, not every storage node may receive a redo log record in order to satisfy a write quorum (e.g., 3 out of 5 storage nodes may be sufficient). The remaining storage nodes that do not receive or acknowledge the redo log record may receive an indication of it from a peer storage node that did acknowledge or receive the redo log record. Client-side driver 540 may generate metadata for each of the redo log records that includes an indication of a previous log sequence number of a log record maintained at the specific protection group. storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to storage system 530. In this example, client-side driver 540 may send these requests to specific ones of the storage nodes 535 of storage system 530, and storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, backup nodes 537 may receive peer-to-peer indications from storage nodes 535. By evaluating these indications backup nodes 537 may identify additional redo log records received at storage nodes 535 that have not been backed up. Backup node(s) 537 may send or store chunks or objects containing a set of redo log records 551 to backup storage system 570 to be stored as part of a backup version of the data volume. In some embodiments, data pages 553 to create a full backup (e.g., a snapshot or pages thereof) of the data volume (as opposed to log records describing the changes to the data volume) or copy of the data volume that may reference data pages stored in another data volume in backup storage system 570 may be requested from storage nodes and sent to backup storage system 570. As discussed below, according to the various techniques with regard to FIGS. 9-12, backup agents may delete data pages or entire snapshot(s) 555 to reclaim storage space in backup storage system 570 according to variable reclamation of data copies, in some embodiments.

In some embodiments, the APIs 531-534 of storage system 530 and the APIs 541-545 of client-side driver 540 may expose the functionality of the storage system 530 to database engine 520 as if database engine 520 were a client of storage system 530. For example, database engine 520 (through client-side driver 540) may write redo log records or request data pages through these APIs to perform (or facilitate the performance of) various operations of the database system implemented by the combination of database engine 520 and storage system 530 (e.g., storage, access, change logging, recovery, and/or space management operations). As illustrated in FIG. 5, storage system 530 may store data blocks on storage nodes 535a-535n, each of which may have multiple attached SSDs. In some embodiments, storage system 530 may provide high durability for stored data block through the application of various types of redundancy schemes.

Note that in various embodiments, the API calls and responses between database engine 520 and storage system 530 (e.g., APIs 531-534) and/or the API calls and responses between client-side driver 540 and database tier components 560 (e.g., APIs 541-545), and between storage system 430 and backup data store 570 in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 6:
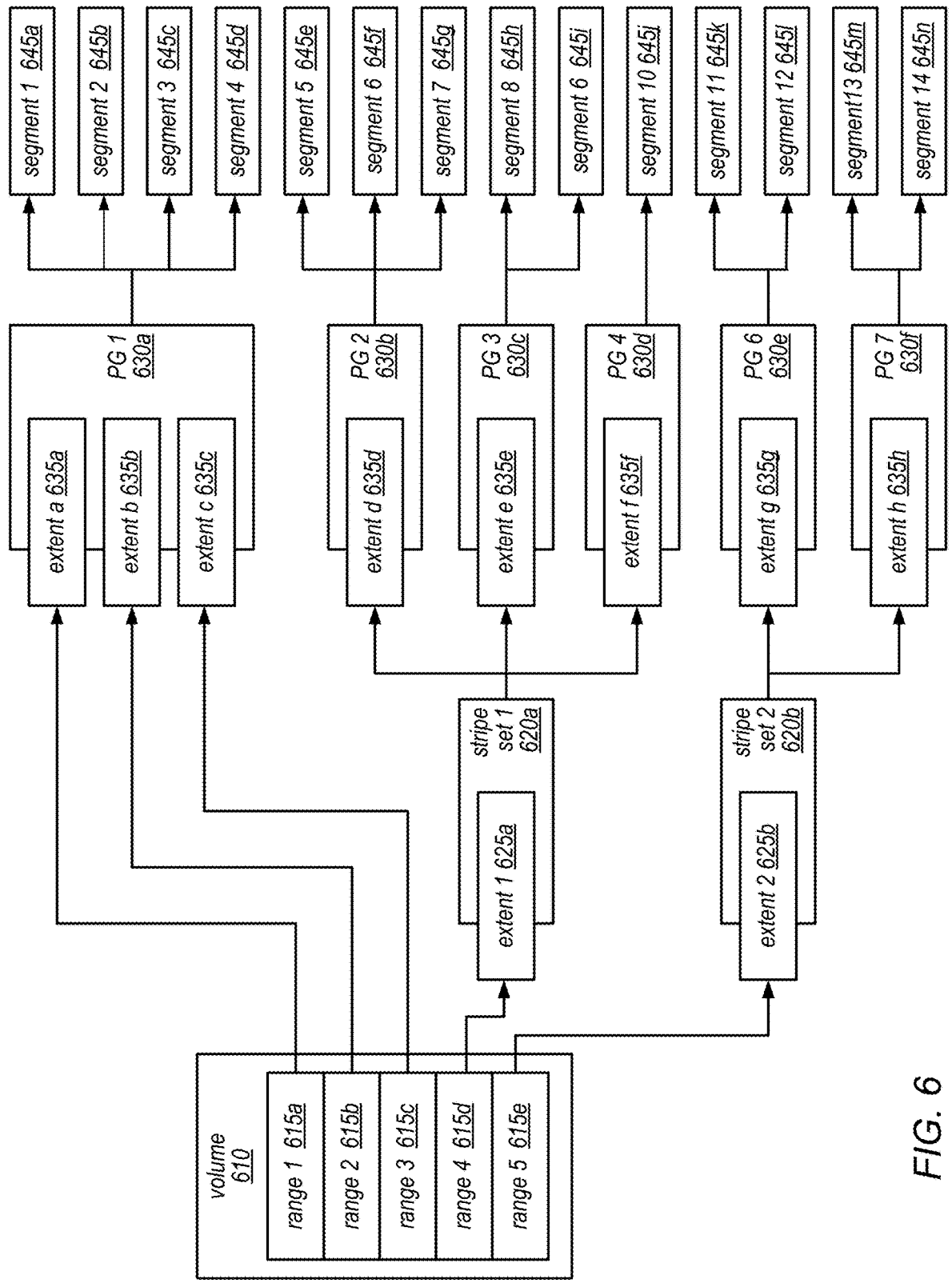
FIG. 6 is a logical block diagram illustrating an example configuration of a data volume, according to some embodiments.

FIG. 6 is a block diagram illustrating an example configuration of a database volume 610, according to one embodiment. Volume 610 may be a logical concept representing a highly durable unit of storage that a user/client/application of the storage system understands, in some embodiments. A volume may be stored or maintained in a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes. In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

In this example, data corresponding to each of various address ranges 615 (shown as address ranges 615a-615e) is stored as different segments 645 (shown as segments 645a-645n). A segment maybe a limited-durability unit of storage assigned to a single storage node, in some embodiments. Multiple segments may be implemented in a protection group to persist an extent. More specifically, a segment may provide limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node, in one embodiment. Within a storage node, multiple segments may live on each storage device, and each segment may be restricted to one storage device (e.g., a segment may not span across multiple storage devices). In some embodiments, a segment may not be required to occupy a contiguous region on an storage device; rather there may be an allocation map in each storage device describing the areas that are owned by each of the segments. As noted above, a protection group may consist of multiple segments spread across multiple storage nodes. In some embodiments, a segment may provide an LSN-type read/ write interface for a fixed-size contiguous range of bytes (where the size is defined at creation). In some embodiments, each segment may be identified by a Segment UUID (e.g., a universally unique identifier of the segment). More specifically, data corresponding to each of various address ranges 615 may be organized into different extents (shown as extents 625a-625b, and extents 635a-635h), and various ones of these extents may be included in different protection groups 630 (shown as 630a-630f), with or without striping (such as that shown as stripe set 620a and stripe set 620b). In this example, protection group 1 illustrates the use of erasure coding. In this example, protection groups 2 and 3 and protection groups 6 and 6 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (620a) and stripe set 2 (620b) illustrates how extents (e.g., extents 625a and 625b) may be striped into a volume, in some embodiments.

More specifically, in this example, protection group 1 (630a) includes extents a-c (635a-635c), which include data from ranges 1-3 (615a-615c), respectively, and these extents are mapped to segments 1-4 (645a-645d). Protection group 2 (630b) includes extent d (635d), which includes data striped from range 4 (615d), and this extent is mapped to segments 5-7 (645e-945g). Similarly, protection group 3 (630c) includes extent e (635e), which includes data striped from range 4 (615d), and is mapped to segments 8-6 (645h-645i); and protection group 4 (630d) includes extent f (635f), which includes data striped from range 4 (615d), and is mapped to segment (645j). In this example, protection group 6 (630e) includes extent g (635g), which includes data striped from range 5 (615e), and is mapped to segments 11-12 (645k-6451); and protection group 7 (630f) includes extent h (635h), which also includes data striped from range 5 (615e), and is mapped to segments 13-14 (645m-645n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 7:
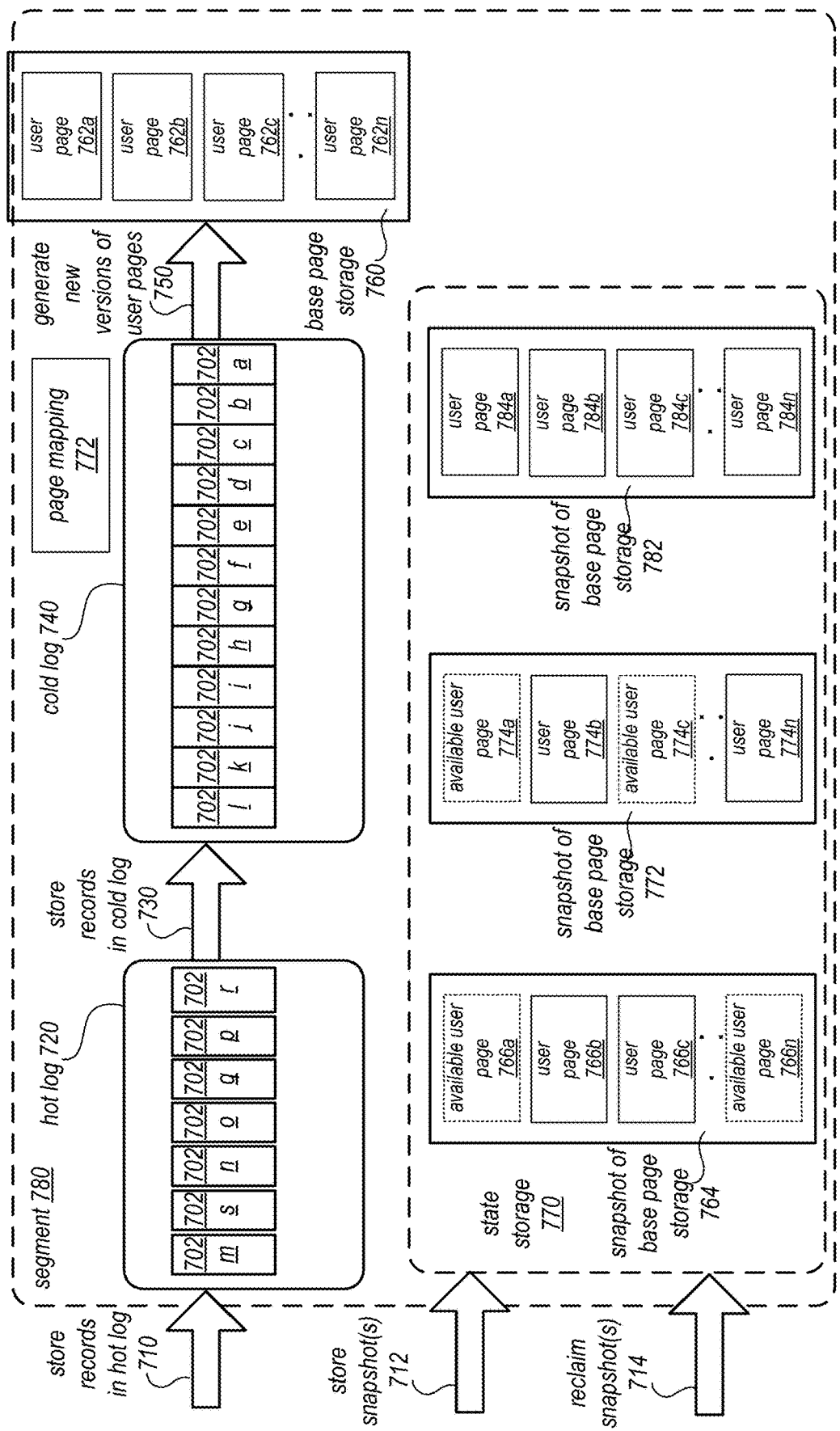
FIG. 7 is a logical block diagram illustrating an example segment with state storage for segment snapshots at a storage node, according to some embodiments.

FIG. 7 is a logical block diagram illustrating an example segment with state storage for segment snapshots at a storage node, according to some embodiments. In some embodiments, a segment, such as segment 780, implement a hot log zone 720 to accept new writes from the client as they are received by the storage node. For example, writes may be received from a client as Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size.

In some embodiments, the storage systems described herein may maintain various data structures, such as page mapping 770, in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the storage systems described herein, a log page table may be stored in memory, and the log page table may be used during garbage collection of the cold log zone. For example, the log page table may identify which log records are obsolete (e.g., which log records can be garbage collected) and how much free space is available on each log page).

Segment 780 may be a segment stored for a database. As noted above log records received at a storage node may be stored 710 in a hot log zone 720. Log records may be received out of order, appended to the hot log zone 720 as they are received. For example, in FIG. 7 the ordering of log records proceeds from record 702r, then 702p, 702q, 702o, 702n, 702s, and finally 702m (contrary to a sequential ordering which might start with 702m to 702s). Log records sent to a storage system, such as described above in FIG. 5, may be sent asynchronously, leading to log records received out of order at hot log 720.

As discussed above, log records may be moved from the hot log 720 to store the log records 730 in the cold log 740. The cold log zone may be populated by copying log records from the hot log zone. In some embodiments, only log records whose LSN is less than or equal to some threshold LSN value may be eligible to be copied to the cold log zone. When moving log records from the hot log zone to the cold log zone, some log records (such as many change log records) may not need to be copied because they are no longer necessary. In addition, some additional coalescing of log records to generate new versions 750 of user pages 762 may be performed at this point (e.g., either to overwrite or store a new version of a user page in a separate location). In some embodiments, log records stored in data blocks grouped together in log pages. In some embodiments, once a given hot zone page or data block has been completely written to cold log 740 and is no longer the newest hot zone data block, and all log records on the hot zone data block have been successfully copied to the cold log zone, the hot zone data block may be freed and reused.

Cold log zone 740 may, in various embodiments, maintain log records for a log-structured data store, such as log records 702a, 702b, 702c, 702d, 702e, 702f, 702g, 702h, 702i, 702j, 702k, and 7021 respectively. The log records, of which many various descriptions presented above, may be AULRs, DULRs, or any other type of log record for the example storage system described above, or any other log-structured data store. These log records may be linked to or associated with a user page 762. For example, a log record may describe an update/change/modification for some portion, or all, of the user page, such as change relative to a previous record or version of the data page (e.g., a DULR). In some embodiments, log records may be stored sequentially in data blocks or pages. Thus, the latest LSN in the ordering of log records maintained in a data block may indicate that all log records in the log page are prior to the latest LSN.

Base page storage 760, may maintain entries or versions of user pages 762a, 762b, 762c through 762n. For example, each entry in base page storage 760 may maintain a replica or copy of the respective user page. In some embodiments, each entry may be compressed, encrypted, or otherwise modified. Other data, such as other log records linked to the data page, may also be stored with the data page in the entry for the data page in backstop 760. Page mapping 770 may identify the locations of user pages, so that when a request to access a user page 762 is received (e.g., in order to read a user page 762), page mapping 770 can be used to access the page.

State storage 770 may store snapshots 712 of the segment (e.g., of base page storage 760) at the same storage node, and in at least some embodiments, on the same storage device as base page storage 760. For example, state storage may include a number of base page storage slots for storing snapshots of base page storage, such as snapshots 764, 772, and 782. As discussed below with regard to FIG. 8, each snapshot need not store an individual copy of each data page but may, in some embodiments, store user pages that are different between snapshots, such as user page 766b, 766c, 774b, 774n, 784a, 784b, 784c, and 784n, and keep as available space for a user page as a result of sharing that user page copy with a prior snapshot (e.g., available user pages 766a, and 774a, share user page 784a, available user page 774c shares user page 784c, and available user page 766n shares user page 774n). In this way, a restore range for a segment based on state storage 770 (e.g., by providing accessed to a prior state of the database according to a snapshot in state storage 770 either by the snapshot alone or with the application of records in the log (e.g., cold log 730) to provide access to a state between snapshots) can be increased by efficiently storing snapshots. However, in other embodiments, each snapshot may be a complete snapshot with no sharing of user data pages. As discussed below with regard to FIGS. 9-12, snapshots in state storage 770 may be reclaimed 714, which may include invalidating entire snapshots or individual user pages within a snapshot).

Figure 8:
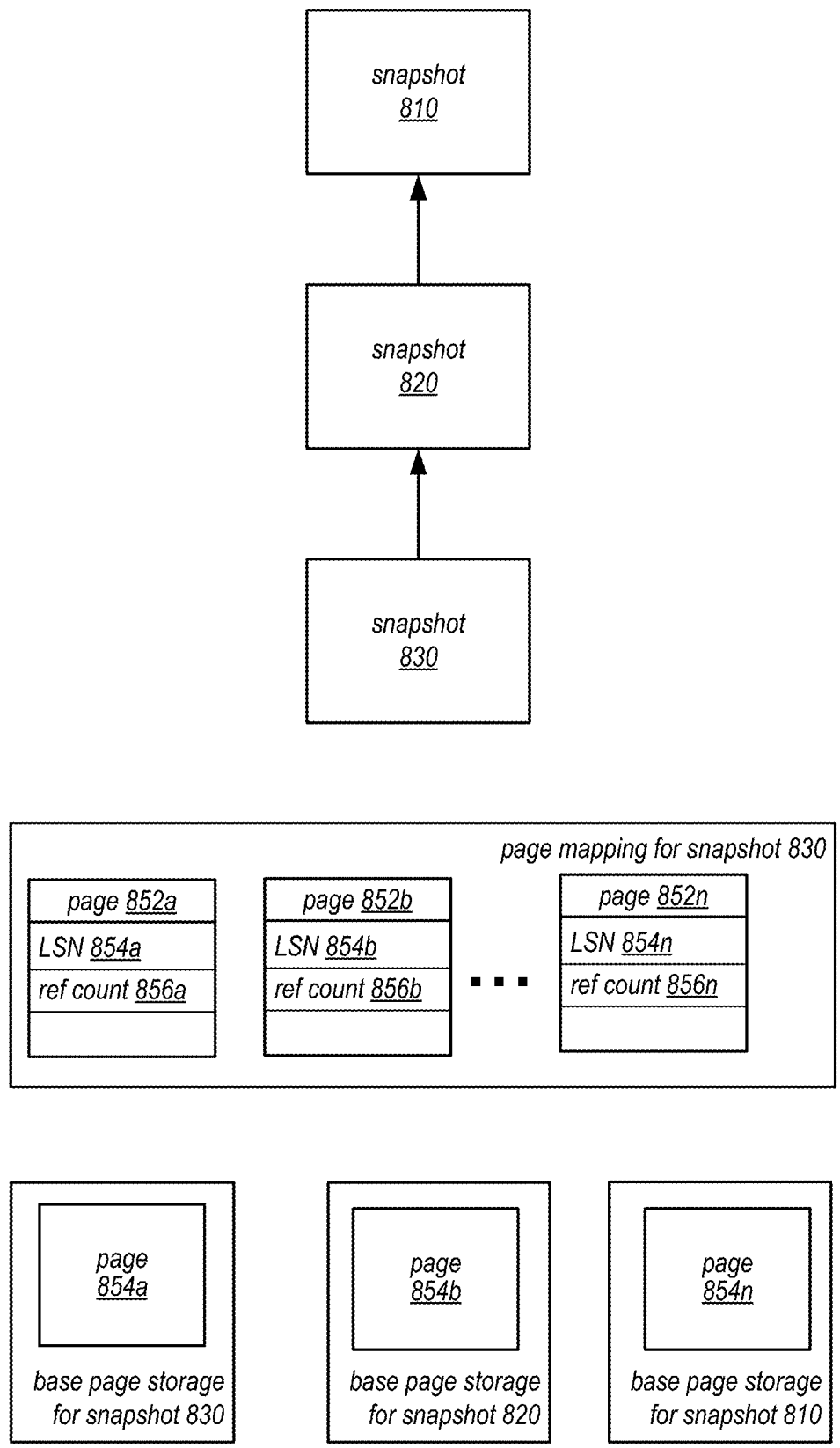
FIG. 8 is a logical block diagram illustrating the relationships between snapshots of prior database states in state storage, according to some embodiments.

FIG. 8 is a logical block diagram illustrating the relationships between snapshots of prior database states in state storage, according to some embodiments. As illustrated in FIG. 8, snapshot 810 of a database may be the source or parent snapshot (e.g., the oldest state) from which various other snapshots may be created. Snapshot 820 may be made (e.g., to add changes that occurred since snapshot 810) from snapshot 810. Likewise snapshot 830 may be created based on the differences between snapshot 820 and snapshot 830. Together these snapshots may provide snapshots of the database at different states, in some embodiments. As each snapshot may be made by sharing database pages, as discussed above, the same data page may be shared amongst multiple snapshots. For example, snapshot 820 may share a data page with snapshot 810. If that data page is not changed for snapshot 820 when snapshot 830 is made, then snapshot 830 share the same data page stored as part of snapshot 810.

For example, page mapping 850 for snapshot 830 may store page mappings for the pages of snapshot 830, such as mappings for pages 852a, 852b, 852n, and so on. Each mapping 852 may include indication of the version of the data page, such as an LSN (e.g., LSNs 854a, 854b, and 854n). The LSN 854 may indicate what changes are included in the stored data page (by indicating the point in the log record sequence for which the current version includes changes described in log records with lesser LSN values), in one embodiment. Page mappings 852 may also include a reference count for a page, such as ref counts 856a, 856b, and 856n. Reference counts 854 may indicate whether a data page is relied upon or referenced by another snapshot, in some embodiments. In one embodiment, separate reference counts may be maintained for each snapshot. For example, snapshot 810 may maintain a reference count of one for data pages that it stores, snapshot 820 page mapping may maintain a reference count of two for a data page pointed to by snapshot 820 (as both snapshot 820 and snapshot 810 point to the shared page), and snapshot 830 page mapping may maintain a reference count of three for a data page pointed to by snapshot 830 in snapshot 810 (as snapshot 830, snapshot 820 and snapshot 810) point to the page. When determining whether a data page in a snapshot needs to be retained for a snapshot that is no longer within the restore range (e.g., has an LSN prior to a garbage collection LSN or is maintained for a snapshot that has been selected for reclamation according to the techniques discussed below with regard to FIGS. 9-12), the sum of all reference count values for the snapshots (e.g., snapshot 810, snapshot 820, snapshot 830, and snapshot 840) may be evaluated. If equal to 1, then only the snapshot selected for reclamation refers to that page and the page can be overwritten, deleted, or reclaimed for storing a new snapshot. As new snapshots are stored, the ref count values 856 may be updated correspondingly. Similar techniques of maintaining reference count values for snapshots in backup storage system 570 and decrementing the values or increasing the reference count values when adding or reclaiming pages for snapshots. However, instead of maintaining reference count values for individual pages, reference count values may be maintained for ranges of pages (e.g., data pages 21,200 to 21,800) may be maintained, so that the reference count values for the large number of snapshots maintained in backup storage system 570 (as opposed to the smaller number of snapshots in state storage 770) can still be maintained according to copy on write techniques. In at least some embodiments, the reference counts for ranges of data pages in backup storage system 570 may be maintained in a separate data store (e.g., another storage service in 230).

Note that the discussion and examples given above with regard to FIGS. 7-8 are not intended to be limiting. Different state storage, for example, can have different numbers of snapshots, or different dependencies between snapshots. Similarly the numbers or location of shared pages can be different or can change.

As noted above snapshot reclamation may be implemented in various types of recovery or backup systems or techniques. FIG. 9 is a logical block diagram illustrating snapshot reclamation, according to some embodiments, that may be incorporated as part of the management or performance components of backup or other restoration systems (whether those discussed above in FIGS. 2-8 or other systems that store or manage snapshots (or other copies of data as discussed below with regard to FIGS. 10-12).

Snapshot reclamation 900 may be implemented as part of a separate server, node, system, or other computing device than the backup agents or storage nodes discussed above, or may be incorporated as part of the management components of such systems, in various embodiments. Snapshot reclamation 900 may implement reclamation event detection 910, in at least some embodiments. A reclamation event may trigger an analysis or other evaluation to select and reclaim stored snapshots, in various embodiments. For example, reclamation event detection may query for, or otherwise monitor the available storage or other storage capacity indication for storage nodes or a backup storage system. If reclamation event detection 910 determines that allocated space for storing snapshots is less a threshold amount (e.g., less than 500 MB), then reclamation event detection may signal, request or otherwise trigger snapshot selection 920 to identify snapshot(s) for reclamation. In some embodiments, reclamation event detection 910 may monitor for other criteria for triggering reclamation events, such as time since last reclamation analysis or cost of storing the different states may be compared with respective threshold values (e.g., greater than 1 day since last reclamation analysis or storage costs for last month exceed $1,000) by tracking the performance of prior reclamation analysis or obtaining storage costs (or other utilization metrics) for storage nodes or a backup storage system. In some embodiments, reclamation event detection 910 may receive requests (e.g., submitted by a user) to initiate reclamation of snapshots. Although snapshot reclamation 900 is illustrated as an event driven process, in some embodiments, snapshot reclamation may continuously perform snapshot selection 920 and reclamation execution 930 (without a triggering event) by periodically (or continuously) sweeping stored snapshots (or metadata describing the snapshots) to determine whether a snapshot should be reclaimed.

Snapshot reclamation 900 may implement snapshot selection 920 to select from stored snapshots those snapshots to be reclaimed. As discussed below with regard to FIGS. 10, 11, and 12, different selection criteria may be evaluated with respect to stored snapshots to determine whether or not a snapshot can be selected. In at least some embodiments, a restoration model 940 may be implemented to forecast or otherwise estimate the probability that a snapshot would be selected to perform a restoration operation. For example, prior restore operations for a database volume may be tracked in order to determine one or more features that identify whether a given snapshot is likely to be selected for a restore operation. Features, such as time snapshot was generated, types of updates or changes included in a snapshot, amount of changes included in a snapshot, identify or a user that submitted changes included in a snapshot, amount of changes between a snapshot, amount of time between the snapshot and a prior snapshot, and so on, may be used alone or in combination to determine a probability or confidence value that a given snapshot is likely to be selected for restoration. Machine learning techniques may be applied to the values of such features that are known to correspond to selected snapshots for restoration (e.g., supervised learning using training examples for the restoration point model 940), such as support vector machines (SVM). In other embodiments, clustering or other unsupervised machine learning techniques may be used to generate or update restoration point model 940 to classify whether a given snapshot is likely to be selected for restoration.

Once snapshots selection 920 identifies snapshots for reclamation, then reclamation execution 930 may initiate operations to reclaim the snapshot(s). For example, reclamation execution 930 may initiate operations to delete the snapshot (or data pages thereof) from a backup storage system or storage node by formulating and sending the appropriate reclamation requests, in some embodiments.

Figure 10:
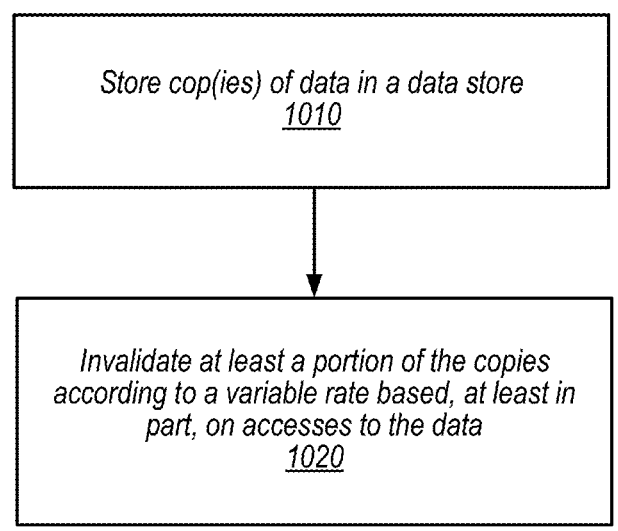
FIG. 10 is a high-level flowchart illustrating methods and techniques to implement variable reclamation of data copies, according to some embodiments.

The storage service and database service discussed in FIGS. 2 through 9 provide examples of a database that may implement variable reclamation for database snapshots. However, various other types of database systems, file systems, or other storage systems may implement variable reclamation of data copies. FIG. 10 is a high-level flowchart illustrating methods and techniques to implement variable reclamation of data copies, according to some embodiments. Various components, systems, or devices, described above may perform the techniques described below with respect to FIGS. 10 and 11 as well as different database systems, file systems, and other data stores.

As indicated at 1010, cop(ies) of data may be stored in a data store, in various embodiments. Data copies may be retained in order to support backup and restore operations, data versioning, forensic or other analysis of changes made to data over time, in some embodiments. The type of data copies stored may, in some embodiments, be dependent on the data. For example, in a log-structured data store, as discussed above with regard to FIGS. 2-9, updates or changes to data may be recorded in logs, which may be eventually used to generate updated data pages at different points in time, depending on a number of changes to be applied to a data page (or other triggering event for generating a new version of a data page). Thus, it may be that storing a copy of a data in a log-structured data store may be distributed either in time with different data pages, data blocks, or other portions of the data being copied when a new version of a data page is generated or distributed in location with data pages of a data volume being stored in different locations (e.g., according to the example volume configuration discussed above with regard to FIG. 6), in one embodiment. Some copies of a database may be created by blocking or halting changes to the data in order to store a complete copy of the data, in some embodiments, while in other embodiments, copy on write or other techniques that allow for updates to the data while copies are stored may be implemented, such as the page referencing techniques discussed above with regard to FIGS. 7 and 8.

In at least some embodiments, cop(ies) of the data may be stored according a fixed rate. For example, the fixed rate may be dependent upon the number of changes made to data (e.g., 100 changes) or the amount of data used to describe the changes (e.g., 10 MB worth of log records applicable to previously generated copy). In another embodiment, cop(ies) may be stored according to time intervals (e.g., every 30 minutes, every 24 hours, etc.). The rate at which copi(es) of the data are stored in a database may be configurable, in some embodiments. For example, a backup system or restore system for a database as discussed above with regard to FIGS. 2-9, may allow a client to send a request that specifies a snapshot frequency (e.g., according to time, number of changes, or amount of data describing changes). In at least some embodiments, a backup system, restore system, or other system that stores and reclaims snapshots may analyze restore requests or other user heuristics to determine the rate for storing cop(ies) of the data, similar to those techniques discussed below for determining a variable rate. In this way, the fixed rate for storing copies for one set of data may be different than the fixed rate for storing copies for another set of data.

As indicated at 1020, at least a portion of the cop(ies) may be invalidated according to a variable rate, in some embodiments. The variable rate may be based, at least in part, on accesses to the data, in some embodiments. For example, the variable rate may vary which copies of the data are retained in the data store over a period of time instead of being reclaimed, deleted, or otherwise invalidated. If, for instance, the copies of the data were stored according to a fixed rate (as noted above), then individual copies (or portions thereof) out of a group of stored copies may be selected for invalidation based on the number of accesses to the data. The group of stored copies may be an evaluation window, timeframe, or other initial selection for considering whether or not a copy should be invalidated, in some embodiments. Consider an example where the copies of data are snapshots of a database are stored in a backup archive (e.g., for restoration operations that can be performed on the database), in one embodiment. The database snapshots may be initially stored every 30 minutes for the database. However, outside an initial 24 hour time frame (e.g., the 48 most recent snapshots of the database any one of which may be likely to be used for a restore operation), each snapshot may be considered for invalidation. For example, the preceding week of snapshots prior to the initial 24 hour time frame would potentially include another 336 snapshots (e.g., snapshots 49 to 385). Of these 336 snapshots, the number of snapshots invalidated may be determined based on the number of changes between snapshots, which may result in a varying rate of invalidating snapshots within the 336 snapshots.

In some embodiments, invalidation decisions may be performed as one or more evaluations of a range or window of data copies corresponding to a period of time or other logical ordering of the copies. Instead of selecting some data copies for one invalidation at one time and not considering the remaining data copies again at a later time, invalidation evaluations may be iteratively performed over the same window (or a window inclusive of some of the same data copies) over time. In this way, as time progresses and copies become further out in time from (e.g., increasingly older than) the current version of the data, the number of older copies may be reduced (as the value in keeping as many older copies of the data may diminish).

Figure 11:
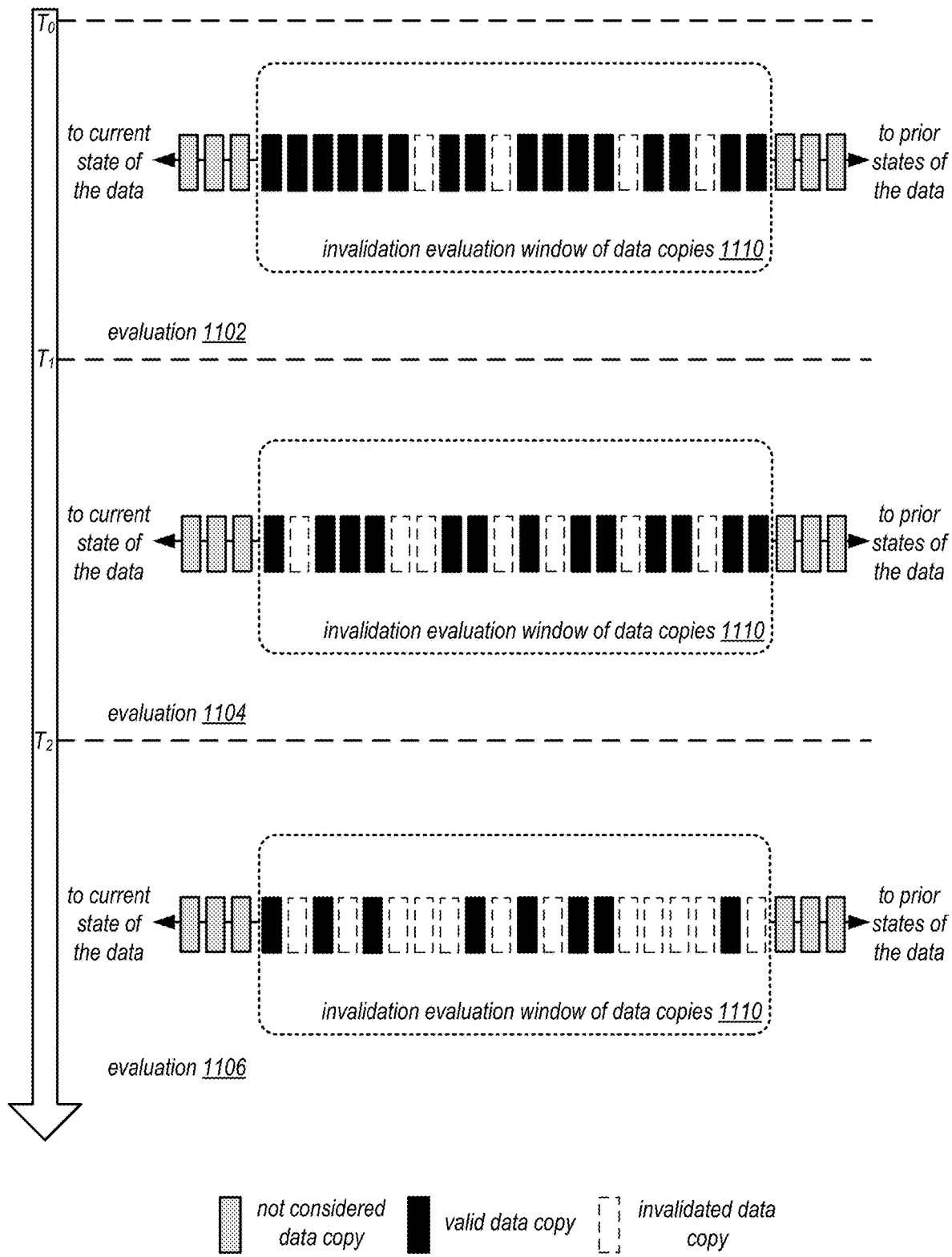
FIG. 11 is a series of logical diagrams illustrating invalidation evaluations for an evaluation window of data copies over time, according to some embodiments.

For example, FIG. 11 is a series of logical diagrams illustrating invalidation evaluations for an evaluation window of data copies over time, according to some embodiments. Copies of data may be considered for invalidation in an invalidation evaluation window 1110 (which may be a portion of the stored states of the data (e.g., a week, a month, a year, a number of copies, a range of sequence numbers associated with the copies, etc.), in some embodiments. A first invalidation evaluation 1102 performed at time $T_0$ may invalidate some data copies (e.g., 4 data copies). In at least some embodiments, other invalidation evaluation windows may be evaluated (e.g., consider prior states of the data in older copies). Then a second invalidation evaluation 1104 may be performed for the same invalidation evaluation window 1110 at time T1. The second invalidation evaluation 1104 may invalidate additional copies (e.g., 3 additional copies to bring the total of invalidated copies to 7). This may occur as the criteria for selecting copies for invalidation may change (e.g., the number of updates between remaining copies may be below a threshold number of updates which is different than a threshold number of updates applied for evaluation 1102). Similarly a third invalidation evaluation 1106 may be performed for the same evaluation window 1110 at time $T_2$. The third invalidation evaluation may invalidate additional copies (e.g., 5 additional copies bringing the total of invalidated copies to 12). Additionally the criteria for selecting copies for invalidation may change (e.g., increasing the number of updates between remaining copies further) so that those copies that do not satisfy the criteria may be invalidated. Thus the rate at which copies of the data are reclaimed or otherwise invalidated may change both from one evaluation window to another and/or from one evaluation of the same window to another evaluation of the same window.

The variable rate for invalidation of copies may be determined according to selection criteria determined from or evaluated by the accesses made to the data (e.g., requests to add, remove, delete, update, or otherwise modify the data), in some embodiments. For example, selection criteria for evaluation may include the number of changes between a first copy and a second copy is below a threshold (e.g., 10,000 changes), then the second copy may be invalidated, in one embodiment. Selection criteria may be determined from accesses to the data in some embodiments. For example, consider a scenario where copies of the data are stored according to a fixed rate over time (e.g., every hour). A time series analysis of updates or other changes to the data (e.g., of log records in a change log) may be performed to identify points, periods, or ranges in time for which few updates are performed (e.g., periods of low data access, such as night time). These points or ranges of time may be used to generate selection criteria that are applicable when considering copies for invalidation (e.g., selection criteria that identifies copies stored between 12:00 am and 6:00 am for invalidation).

In some embodiments, heuristics specific to a user (or users) of the data may be determined and used to identify selection criteria. For example, prior operations or other requests for copies of the data (e.g., database snapshots to perform restore operations) made by a user with respect to the data may be tracked. If, for instance, a user requests restore operations at a particular time of day or after a pattern of updates to the data (e.g., schema changes to a database to add or drop columns, add or drop tables, change data types, etc.), then selection criteria may be determined according to the heuristic identified for restore operations based on the time of day or update patterns. For example, selection criteria may include criteria that block, stop, or exclude a copy of the data from invalidation that may be otherwise identified for invalidation (e.g., based on other selection criteria, such as amount of changes) if that copy of the data matches or approximates the heuristic for a likely restore operation (e.g., the copy is associated with a time commonly selected for a restore operation or stores a version of data prior to a pattern of updates that commonly precede a restore operation).

Invalidation of a copy may be performed in various ways. For example, in some embodiments, the copy of the data may be deleted (or portion thereof). In another embodiment, the copy (or portion thereof) may be marked (e.g., tombstone marker), modified (e.g., overwritten with invalid data) or otherwise identified (e.g., in a skip list) as unavailable for access. As the techniques discussed above (and below with regard to FIG. 12) may apply to a portion of a copy (e.g., a page, block, file, or other object or structure that is part of the data), then the same invalidation techniques may be applied (including the techniques for selecting the portion), in various embodiments.

Figure 12:
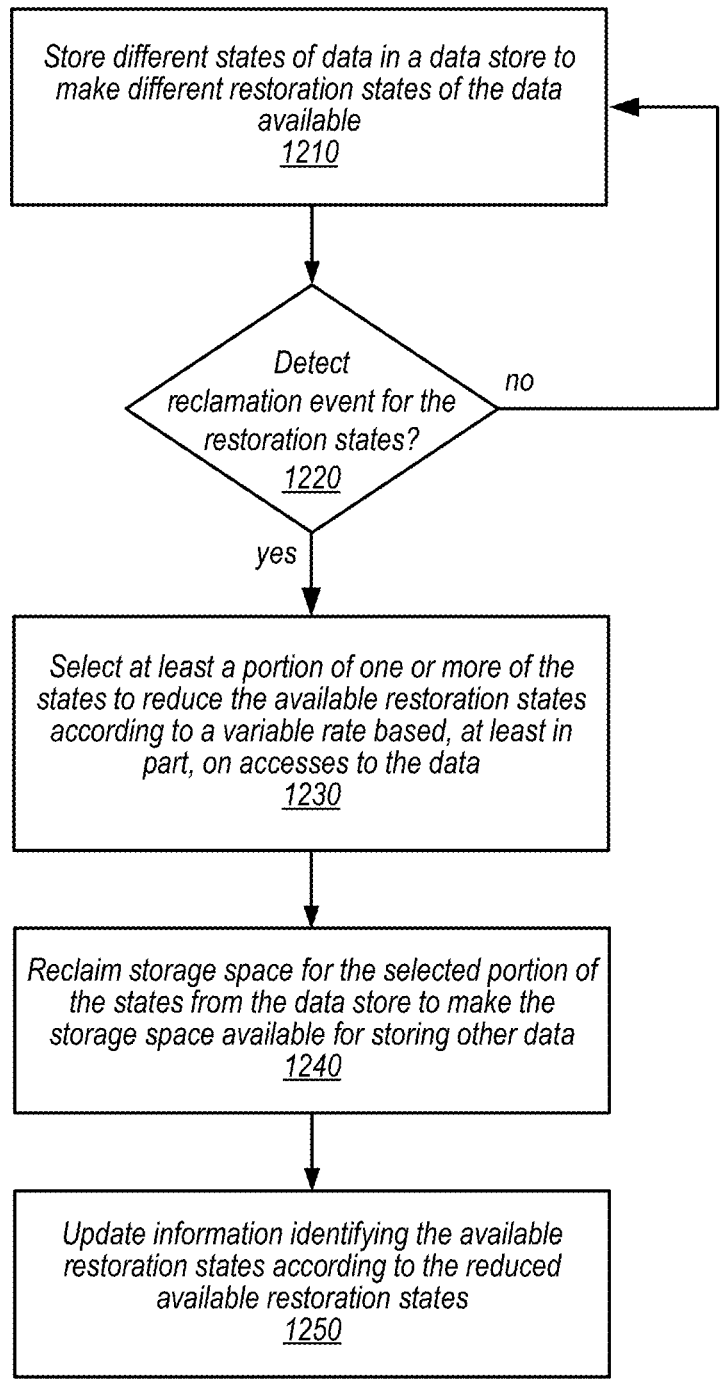
FIG. 12 is a high-level flowchart illustrating methods and techniques to store and reclaim different states of data available for restoration, according to some embodiments.

Copies of data may be maintained to perform restore operations, in some embodiments. A restore operation may use a copy to provide access to a prior version of data (as opposed to a current version of data). In this way, errors in the data can be undone, different states can be accessed, or other operations that utilize prior states restored for access can be performed. FIG. 12 is a high-level flowchart illustrating methods and techniques to store and reclaim different states of data available for restoration, according to some embodiments.

As indicated at 1210, different states of data in a data store may be stored in order to make different restoration states of the data available, in various embodiments. For example, as discussed above with regard to FIG. 10, snapshots or other copies of the data describing the data at different states may be periodically determined, captured, and/or stored. The states of the data may be stored according to a fixed rate (e.g., based on the amount of changes made to the data or the amount of time between states), in some embodiments. In at least some embodiments, log records or other change indications may be stored as part of a log describing the changes to the data in the data store (or a different data store). Restore operations may make the stored states available for access (or make other states of the data not stored in the data store by applying the changes from the log to a copy prior to the desired restoration state), in various embodiments.

As indicated at 1220, reclamation events may be detected in some embodiments. A reclamation event may trigger an analysis or other evaluation to select and reclaim stored states of the data, in various embodiments. For example, available storage or other storage capacity indication for the data store may trigger a reclamation event (e.g., allocated space for storing prior states of the data in the data store available to store additional states is less than 10 Gigabytes). Similar threshold criteria triggering reclamation events, such as time since last reclamation analysis or cost of storing the different states may be compared with respective threshold values (e.g., greater than 1 day since last reclamation analysis or storage costs for last month exceed $1,000). In some embodiments, reclamation events may be manually triggered (e.g., by a user request submitted via an API or other interface) to initiate reclamation of states of the data.

As indicated at 1230, at least a portion of one or more for the states may be selected to reduce the available restoration states according to a variable rate, in some embodiments. As discussed above with regard to FIG. 10, the variable rate may be based, at least in part, on accesses to the data. For example, different selection criteria may be determined from or evaluated according to the number of access requests, types of access requests, identity of users submitting the access requests, time at which the access requests are received (e.g., time of day), and so on. Additional selection criteria, or various combinations of selection criteria may be utilized, such as selection criteria that exclude states from invalidation (e.g., according to restoration operation user heuristics) or time series analysis of likely states to be selected for restoration. As discussed above with regard to FIG. 9, in at least some embodiments, a probability model for identifying which states are above or below a restoration threshold may be used to determine if a state should be selected.

As indicated at 1240, storage space in the data store may be reclaimed for the selected portion (or the entirety of) the selected state(s) to make the storage space available for storing other data, in some embodiments. For example, the portion (e.g., data page(s), block(s), object(s), file(s), or other portion(s)) or the entire state (e.g., volume, file system, directory, etc.) may be deleted, in some embodiments. In other embodiments, the portion or the entire state may be marked, overwritten, or otherwise identified as available to store other data, in some embodiments. As indicated at 1250, information identifying the available restoration states may be updated according to the reduced available restoration states, in some embodiments. For example, a listing of snapshots may be updated to remove the reclaimed snapshots. In some embodiments, a request to restore data to a desired state may be rejected for a state that has been identified as reclaimed, deleted, or otherwise invalidated, in some embodiments.

Note that in embodiments, such as the log structured storage system discussed above with regard to FIGS. 2-9, preservation of the log may still allow for reclaimed states to be recovered using the log (even if such a restoration would involve the application of a greater number of log records or changes to an existing state that is older than a reclaimed state). For example, if a request to restore a state of the data that occurs after a reclaimed snapshot is received, then a snapshot older than the reclaimed snapshot may be identified according to the information, and log records applied to the older snapshot to generate the desired state.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 13:
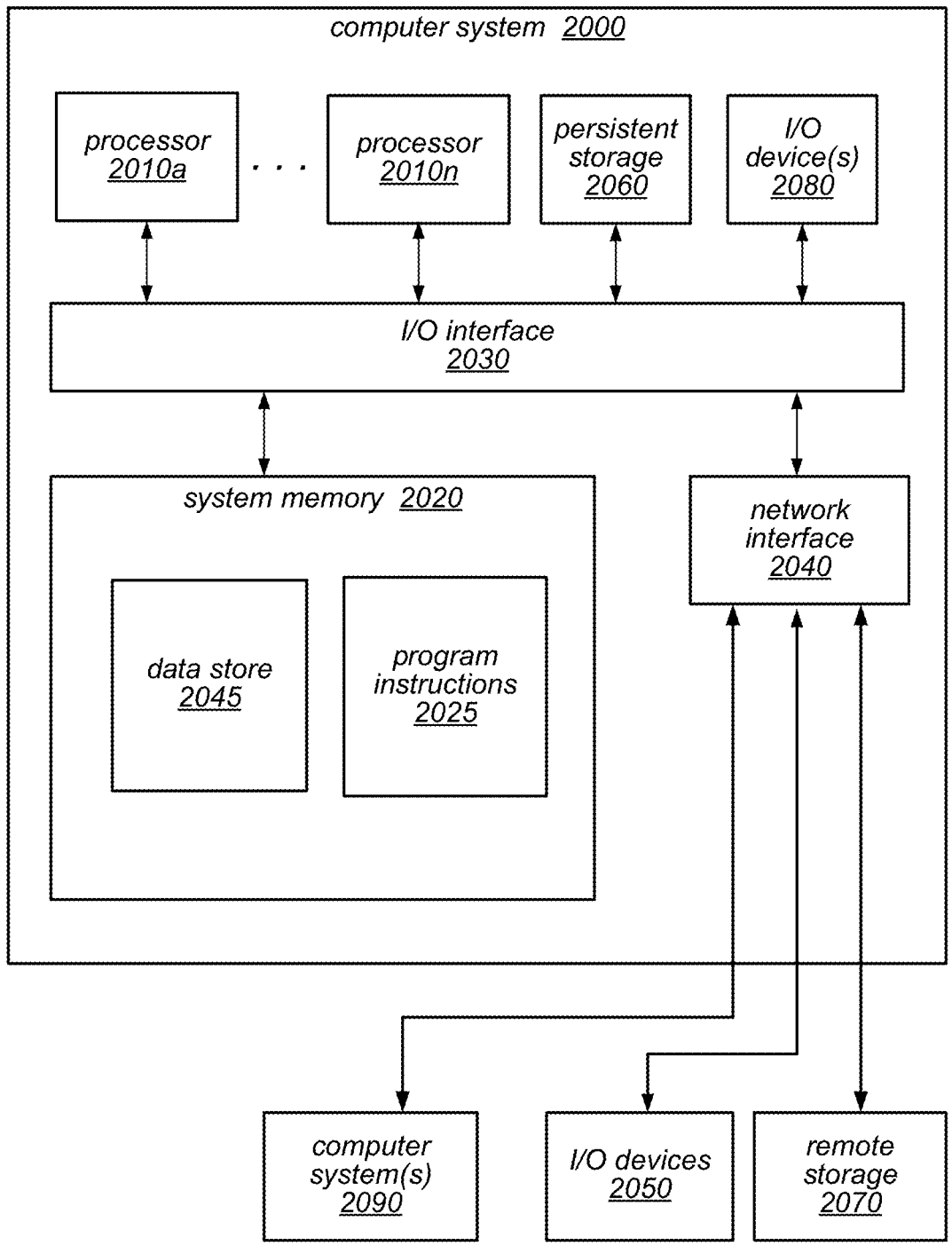
FIG. 13 is an example computer system, according to various embodiments.

FIG. 13 is a block diagram illustrating a computer system according to various embodiments, as well as various other systems, components, services or devices described above. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that can store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes, backup nodes, or restore nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor; and
    a memory storing program instructions that when executed by the at least one processor, cause the at least one processor to implement a data store configured to:
    store different states of data in a data store to make different restoration states of the data available for different points in time, wherein the different states of data in the data store comprise a particular state for a point in time older than respective points in time for one or more other states; and
    make unavailable a portion of the available restoration states at a variable rate to reduce a number of the available restoration states that are selectable for a restore operation, wherein the variable rate is based, at least in part, on accesses to the data, and wherein to make unavailable the portion of the available restoration states at the variable rate the data store is further configured to:
        select one or more states of the different states, from the one or more of the other states and excluding the particular state, to provide a selection of restoration states according to the variable rate, wherein the selecting is based, at least in part, on selection criteria determined according to the accesses to the data, and wherein the selection of restoration states comprises the particular state; and
        reclaim storage space for the selected one or more states from the data store to make the storage space available for storing other data.

2. The system of claim 1, wherein the memory stores further program instructions that further cause the at least one processor to:
    detect a reclamation event for the restoration states; and
    perform the selection of the portion of the different states and the reclamation of the storage space for the selected portion in response to the detection of the reclamation event.

3. The system of claim 1, wherein the memory stores further-program instructions that further cause the at least one processor to:
    store log records describing changes to the data in a log;
    update information identifying the available restoration states according to the reduced available number of restoration states;
    in response to a request to restore the data to a desired state after the selected portion of the state:

identify another one of the other states stored prior to the selected portion of the state according to the identifying information for the available restoration states; and apply one or more of the log records in the log to the identified other state to generate the desired state of the data.

4. The system of claim 1, wherein the data is a database volume stored in a storage service separate from a database service, wherein the database service and the storage service are implemented as part of the same network-based services platform, wherein the data store that stores the copies of the database volume is a backup storage system implemented as part of the network-based services platform, and wherein to reclaim the storage space for the selected portion, the program instructions cause the at least one processor to send a request to delete the selected portion from the backup storage system.

5. A method, comprising:

storing a plurality of copies of data in a data store, the plurality of copies comprising a particular copy for a point in time older than respective points in time of one or more other copies;

selecting, from the one or more other copies of the data excluding the particular copy, a portion of the plurality of copies of the data for invalidation to reduce, at a variable rate, a number of the plurality of copies of data in the data store, wherein the selecting is based, at least in part, on selection criteria determined according to accesses to the data, and wherein the selection criteria provides selection of copies of data, comprising the particular copy, according to the variable rate; and invalidating the selected portion of the plurality of copies of the data in the data store.

6. The method of claim 5, wherein selecting the portion of the plurality of copies of the data comprises determining that one or more changes between the portion of the one or more other copies and another copy of the data stored in the data store is below a threshold.

7. The method of claim 5, wherein selecting the portion of the plurality of copies of the data comprises determining that a probability that the one or more other copies will be selected for a restoration operation is below a threshold.

8. The method of claim 5, wherein the portion of the plurality of copies is selected for invalidation according to a first set of the selection criteria, wherein the portion of the plurality of copies was previously evaluated for invalidation according to a second set of the selection criteria, and wherein the portion was not selected for invalidation according to the second set of the selection criteria.

9. The method of claim 5, further comprising:

detecting an event to perform the invalidation for the portion of the plurality of copies of the data in the data store; and performing the invalidating of the portion of the plurality of copies in response to detecting the event.

10. The method of claim 5, wherein the portion of the plurality of copies of the data is selected according to the selection criteria and wherein the method further comprises determining the selection criteria based, at least in part, a time series analysis of the accesses to the data.

11. The method of claim 5, wherein the invalidated portion of the plurality of copies is a data page of the copies.

12. The method of claim 5, further comprising:

receiving a request to restore the data to a desired state based, at least in part, on the invalidated portion of the plurality of copies; and in response to receiving the request, denying the request to restore the data.

13. The method of claim 5, wherein the data is a database volume, wherein the accesses are requests to read from or write to the database volume, and wherein invalidating the portion of the plurality of copies comprises deleting the selected portion of the plurality of copies from the data store.

14. A non-transitory, computer-readable storage medium, storing program instructions that when executed by one or more computing devices cause the one or more computing devices to implement:

storing a plurality of copies of data in a data store, the plurality of copies comprising a particular copy for a point in time older than respective points in time of one or more other copies;

selecting, from the one or more other copies of the data excluding the particular copy, a portion of the plurality of copies of the data for invalidation to reduce, at a variable rate, a number of the plurality of copies of data in the data store, wherein the selecting is based, at least in part, on selection criteria determined according to accesses to the data and wherein the selection criteria provides selection of copies of data, comprising the particular copy, according to the variable rate; and invalidating the selected portion of the one or more other copies of the data in the data store.

15. The non-transitory, computer-readable storage medium of claim 14, wherein the selection of the portion of the plurality of copies is further based on or more requests to restore the data to a desired state.

16. The non-transitory, computer-readable storage medium of claim 14, wherein the program instructions cause the one or more computing devices to further implement:

detecting an event to perform the invalidation for the portion of the plurality of copies of the data in the data store; and performing the selecting the portion of the plurality of copies and the invalidating of the selected portion in response to detecting the event.

17. The non-transitory, computer-readable storage medium of claim 14, wherein the invalidated portion of the plurality of copies is selected for invalidation according to a first set of the selection criteria, wherein the invalidated portion of the plurality of copies was previously evaluated for invalidation according to a second set of the selection criteria, and wherein the invalidated portion was not selected for invalidation according to the second set of the section criteria.

18. The non-transitory, computer-readable storage medium of claim 14, wherein selecting the portion of the plurality of copies of the data for invalidation comprises determining that a probability that the invalidated portion of the plurality of copies will be selected for a restoration operation is below a threshold.

19. The non-transitory, computer-readable storage medium of claim 14, wherein the program instructions cause the one or more computing devices to further implement:

storing log records describing changes to the data in a log;

updating information identifying available restoration states according to the invalidated portion of the plurality of copies of the data;

in response to a request to restore the data to a desired state after the invalidation of the portion of the plurality of copies of the data:

identifying another copy of the data stored in the data store prior to the invalidated portion of the plurality of copies according to the identifying information for the available restoration states; and applying one or more of the log records in the log to the identified other copy to generate the desired state of the data.

20. The non-transitory, computer-readable storage medium of claim 14, wherein the data is a file system, wherein the accesses are requests to access one or more files in the file system, and wherein, invalidating the selected portion of the one or more other copies, the program instructions cause the one or more computing devices to implement deleting the selected portion of the one or more other copies from the data store.

* * * * *